United States Patent [19]
Miyoshi

[11] Patent Number: 5,854,639
[45] Date of Patent: *Dec. 29, 1998

[54] GRAPHIC DISPLAY UNIT AND GRAPHIC DISPLAY METHOD USING THE SAME

[75] Inventor: Takaaki Miyoshi, Yohohama, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 912,826

[22] Filed: Aug. 19, 1997

Related U.S. Application Data

[63] Continuation of Ser. No. 368,016, Jan. 3, 1995, abandoned.

[30] Foreign Application Priority Data

Mar. 3, 1994 [JP] Japan ..................................... 6-033923

[51] Int. Cl.⁶ ................................................ G06F 15/167
[52] U.S. Cl. ........................... 345/512; 345/503; 345/514
[58] Field of Search ..................................... 345/501–503, 345/512, 513, 522, 514; 395/733, 553, 559

[56] References Cited

U.S. PATENT DOCUMENTS 5,299,309   3/1994   Kuo et al ................................. 395/164

FOREIGN PATENT DOCUMENTS 1-316880   12/1989   Japan .............................. G06F 15/66
4-190389   7/1992   Japan .............................. G09G 5/06

OTHER PUBLICATIONS

TMS 34020 User's Guide, 1990, Texas Instruments Sections 6.5 and 6.10.

*Primary Examiner*—Kee M. Tung
*Attorney, Agent, or Firm*—Staas & Halsey

[57] ABSTRACT

The data transferred from a computer to the accelerator are stored in the transfer data storage region together with the transfer flag that indicates the destination of transfer. The transfer data determination unit determines the destination of data transfer from the transfer flag, and the graphic data that do not need to be extended are directly written into the graphic data storage means of the accelerator, and the graphic data that do need to be extended and the control data are written into the shared memory. The graphic data are extended by the graphic data extension processing unit and are written into the graphic data storage unit. The interrupt control unit and the interrupt processing unit work to change over the writing of graphic data into the graphic data storage unit and bring the output from the transfer data determination unit into synchronism with the output from the graphic data extension processing unit. The graphic data processing unit processes the graphic data written into the graphic data storage means and displays the data on the display unit.

2 Claims, 12 Drawing Sheets

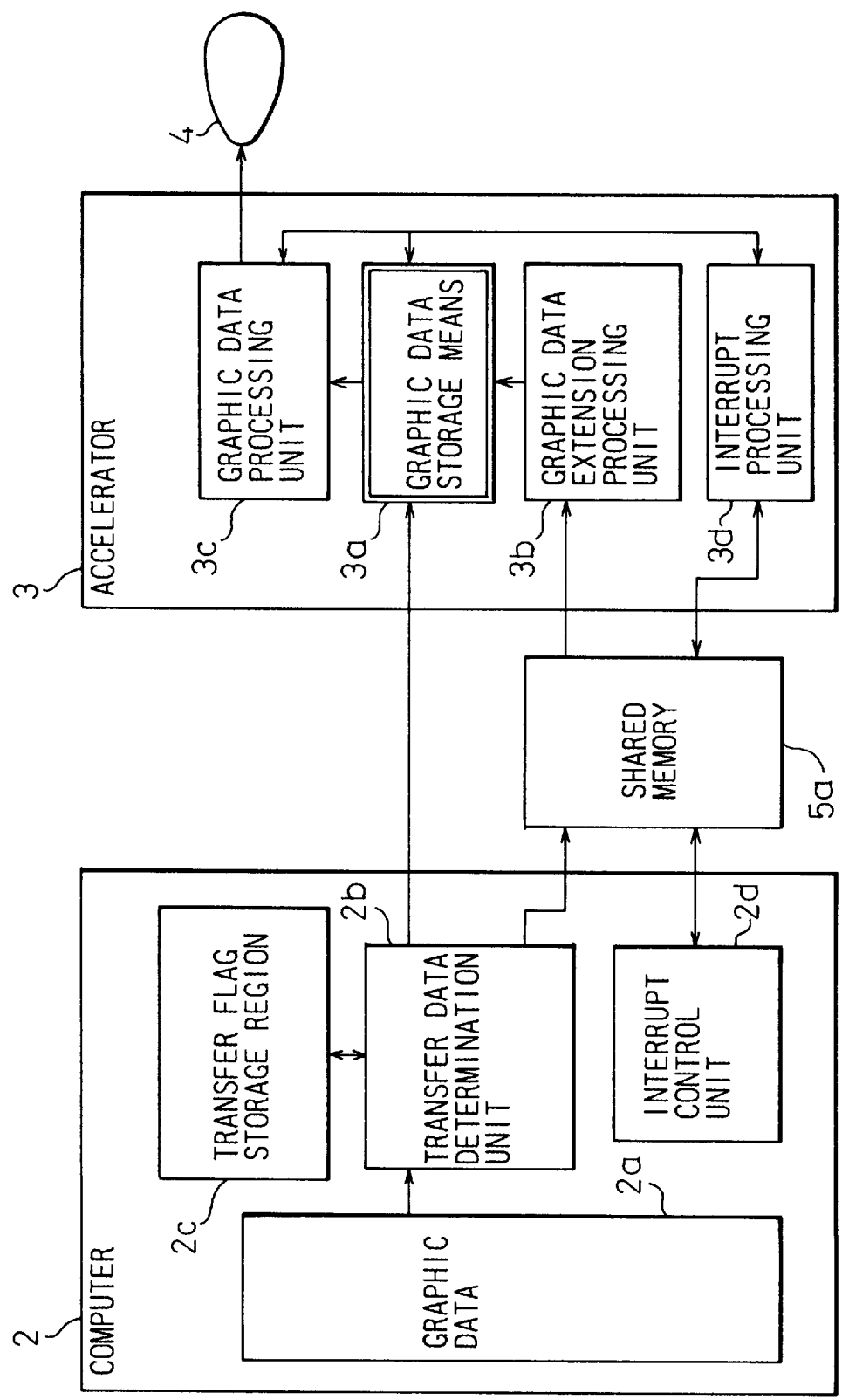

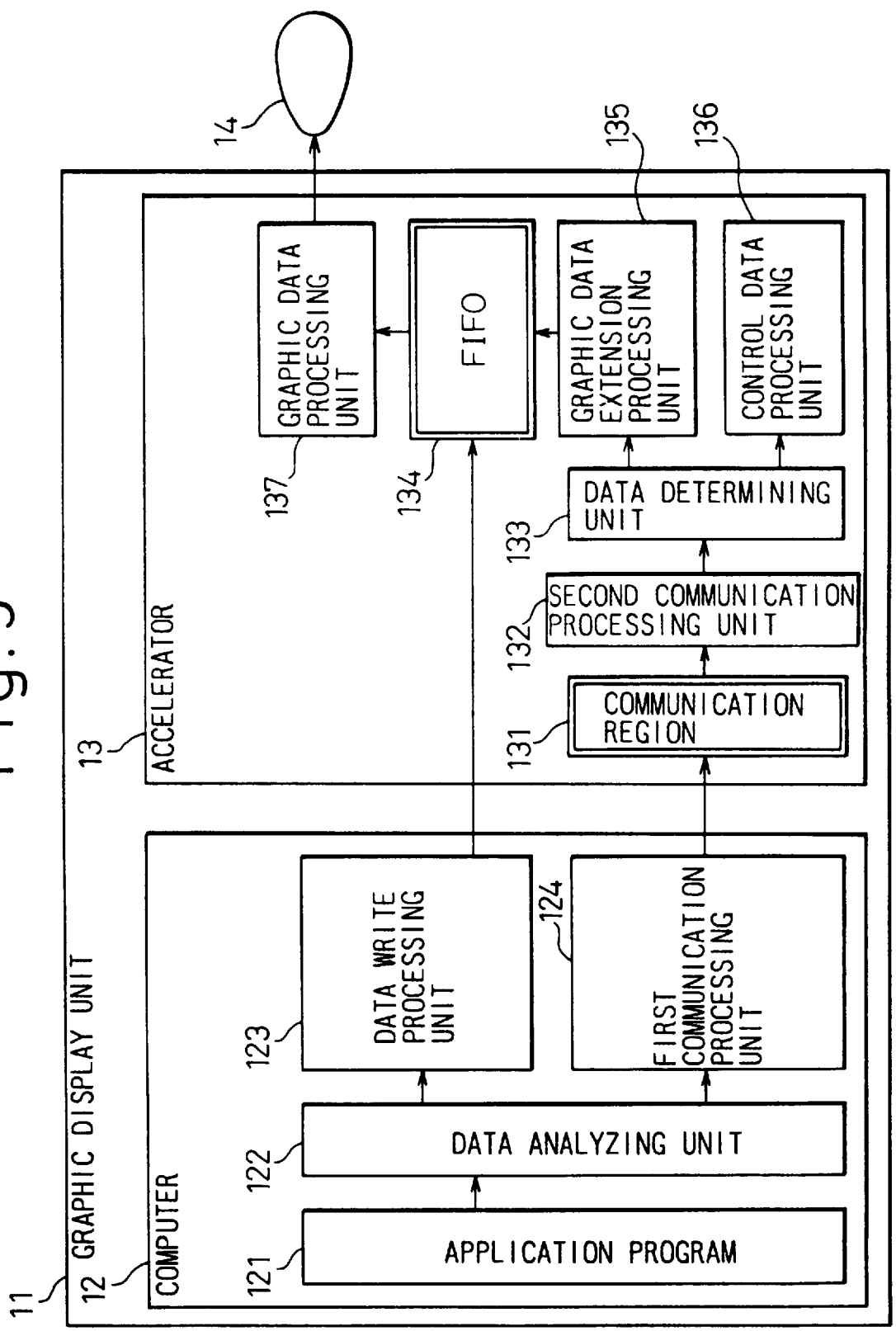

GRAPHIC DISPLAY UNIT AND GRAPHIC DISPLAY METHOD USING THE SAME

This application is a continuation of application Ser. No. 08/368,016, filed Jan. 3, 1995, now abandoned.

BACKGROUND OF THE INVENTION

1. Field of the Invention

The present invention relates to a graphic display unit constituted by a computer and an accelerator connected thereto and to a method thereof. More specifically, the invention relates to a graphic display unit which is capable of executing graphic display at a high speed and to a method thereof.

2. Description of the Related Art

There has heretofore been known a graphic display unit constituted by a computer and an accelerator connected thereto.

The conventional graphic display unit includes a display for displaying figures, a computer (main processor) and an accelerator (sub-processor) for displaying figures at high speed. The computer is equipped with an application program and a first communication processing unit. The accelerator includes a communication region, a second communication processing unit, a data analyzing unit, a graphic data processing unit and a control data processing unit.

When an application program is run on the computer, the application data are stored in the communication region via the communication first processing unit in the computer and are transmitted to the accelerator.

The accelerator discriminates whether the data are input to the communication region or not. When the data have been input to the communication region, the data are received by the second communication processing unit in the accelerator, namely the data are read out from a storage destination in the communication region.

It is then determined whether the data received by the data analyzing unit are graphic data or are control data. The data are then handed over to a graphic data processing unit or to a control data processing unit. The graphic data processing unit processes the graphic data from the data analyzing unit and displays the graphic display on a display. The conventional graphic display unit will be described later in further detail with reference to the drawings.

According to the above-mentioned conventional graphic display unit, however, the graphic data and the control data are processed and transmitted through a communication processing unit in the computer and through a communication processing unit in the accelerator. Therefore, performance is very dependent upon the operating time of the communication processing program and cannot be increased to a sufficient degree even when the processing speeds of other portions are increased.

SUMMARY OF THE INVENTION

The present invention was accomplished in order to solve the above-mentioned problem inherent in the prior art, and its object is to provide a graphic display unit and a graphic display method which are capable of displaying graphics at high speed without depending upon the communication processing speed.

According to a first aspect of the present invention, there is provided a graphic display unit comprising a computer, an accelerator connected to the computer, and shared memory capable of being accessed by both the computer and the accelerator, wherein the accelerator is provided with a graphic data storage means for storing graphic data and a graphic data extension processing unit that processes graphic data written into the shared memory, the computer is provided with a transfer data determination unit which determines whether the graphic data be directly written into the graphic data storage means or into the shared memory. The computer, based upon the result of determination by the transfer data determination unit, writes graphic data that does not need to be extended directly to the graphic data storage means and writes graphic data that needs to be extended into the shared memory, and the accelerator receives the graphic data written into the shared memory, processes the graphic data through the extension processing unit, writes the graphic data into the storage means, and displays on a display unit the graphic data that have been written into the graphic data storage means.

It is desired that the computer is provided with a transfer flag storage region which stores a transfer flag that indicates whether the graphic data are those that should be directly written into the graphic data storage means or not, and the transfer data determination unit determines depending upon said transfer flag whether the graphic data be written into the graphic data storage means or into the shared memory.

It is desired that the computer is provided with an interrupt control unit that issues an interrupt to bring into synchronism the writing of graphic data into the graphic data storage means, and that the accelerator is provided with an interrupt processing unit which, upon receiving the interrupt causes the graphic data that have been written into the graphic data storage means to be displayed.

According to a second aspect of the present invention, there is provided a graphic display method which uses a graphic display unit which comprises a computer having a graphic data and a transfer data determination unit, an accelerator which has a graphic data storage means and a graphic data extension processing unit and is connected to the computer, a shared memory capable of accessing both the computer and the accelerator, and a display unit connected to the accelerator, wherein the graphic data are written by using the transfer data determination unit in a manner that the graphic data that do not need to be extended are directly written into the graphic data storage means and the graphic data that do need to be extended are written into the shared memory, the accelerator writes the graphic data of the shared memory into the graphic data storage means via the graphic data extension processing unit, and the graphic data written into the graphic data storage means are displayed on the display unit.

It is desired that the transfer data determination unit selectively writes the graphic data into the graphic data storage means directly, or via the shared memory, by using a flag from the transfer flag storage region provided in the computer.

It is desired that the graphic display method further comprises a step (adjusting the timing) of bringing the writing of graphic data via the shared memory and the graphic data extension processing unit into synchronism with the direct writing of graphic data into the graphic data storage means from the transfer data determination unit, and a step of causing the display of graphic data written into the graphic data storage means.

Other features and advantages of the invention will become apparent from the following description with reference to the accompanying drawings.

BRIEF DESCRIPTION OF THE DRAWINGS

FIG. 4 is a block diagram explaining the outline of the present invention;

FIG. 5 is a block diagram illustrating a graphic display unit according to an embodiment of the present invention;

DESCRIPTION OF THE PREFERRED EMBODIMENTS

Prior to describing the embodiment of the present invention, a conventional graphic display unit will be briefly described with reference to FIGS. 1, 2 and 3.

Figure 1:
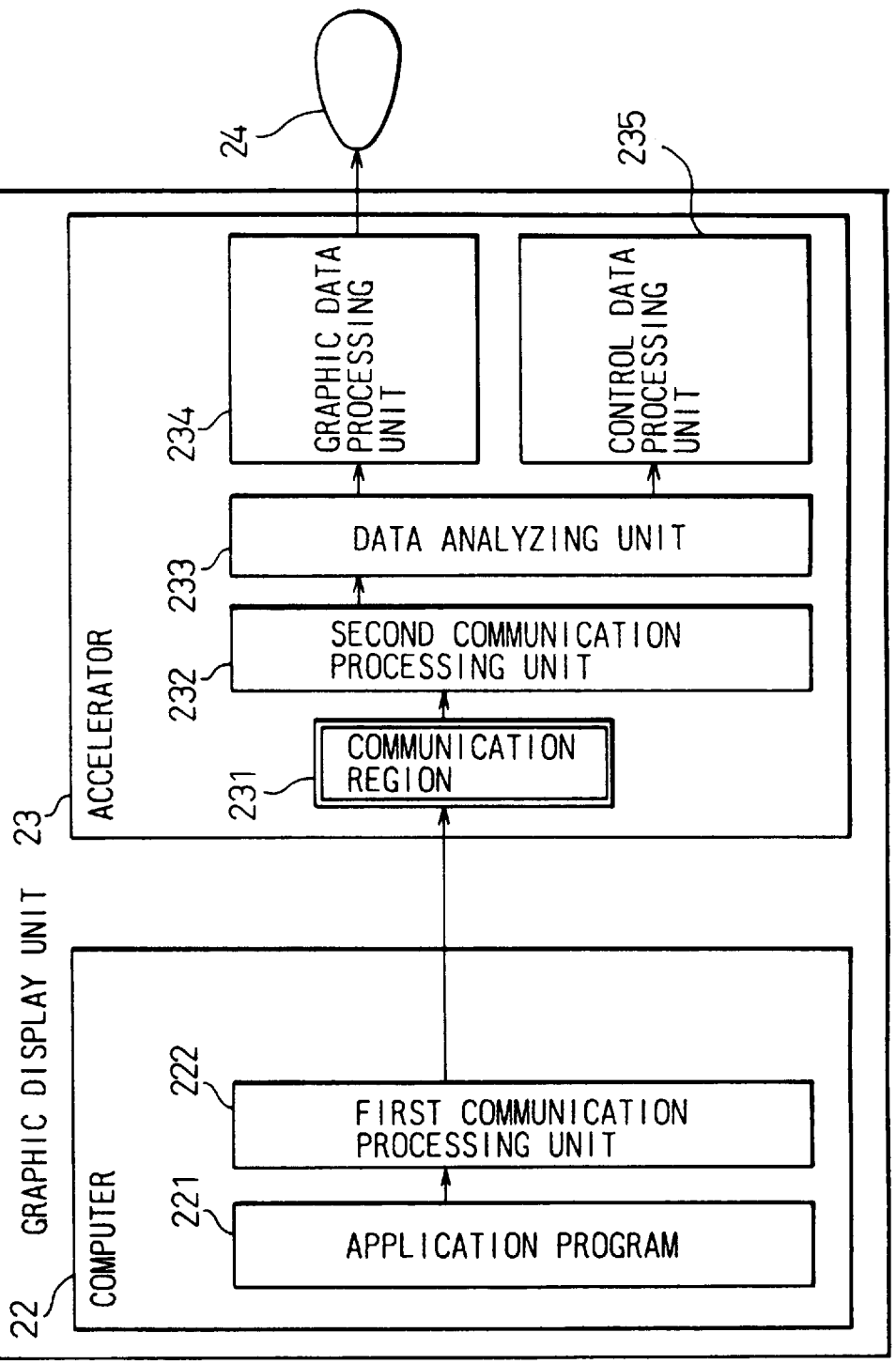
FIG. 1 is a block diagram illustrating a conventional graphic display unit.

FIG. 1 is a diagram, illustrating the constitution of the above-mentioned conventional graphic display unit, wherein reference numeral 21 denotes a graphic display unit, 24 denotes a display for displaying graphics, 22 denotes a computer (main processor, hereinafter referred to as the computer), and 23 denotes an accelerator (sub-processor, hereinafter referred to as the accelerator) that displays figures at high speed. FIGS. 2 and 3 are flow charts illustrating the operations in the computer and in the accelerator in the conventional graphic display unit.

Figure 2:
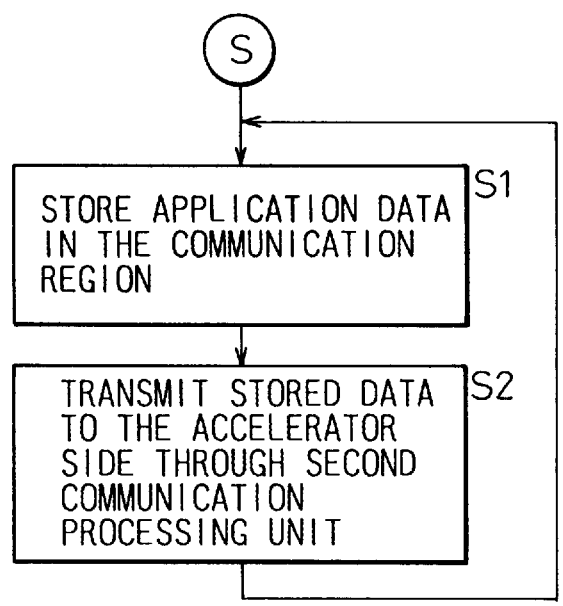
FIG. 2 is a flow chart illustrating the processing in a computer in the conventional graphic display unit.

In FIG. 1, when an application program 221 operates in the computer 22, the application data are stored in a communication region 231 via a communication processing unit 222 and are transmitted to the accelerator 23 (steps S1 and S2 in FIG. 2).

It is determined, by the accelerator 23, whether data are input to the communication region 231 or not. When data are input to the communication region 231, the data are received by a communication processing unit 232 (step S11 in FIG. 3), namely the data are read out from a storage destination in the communication region 231 (step S12 in FIG. 3).

Figure 3:
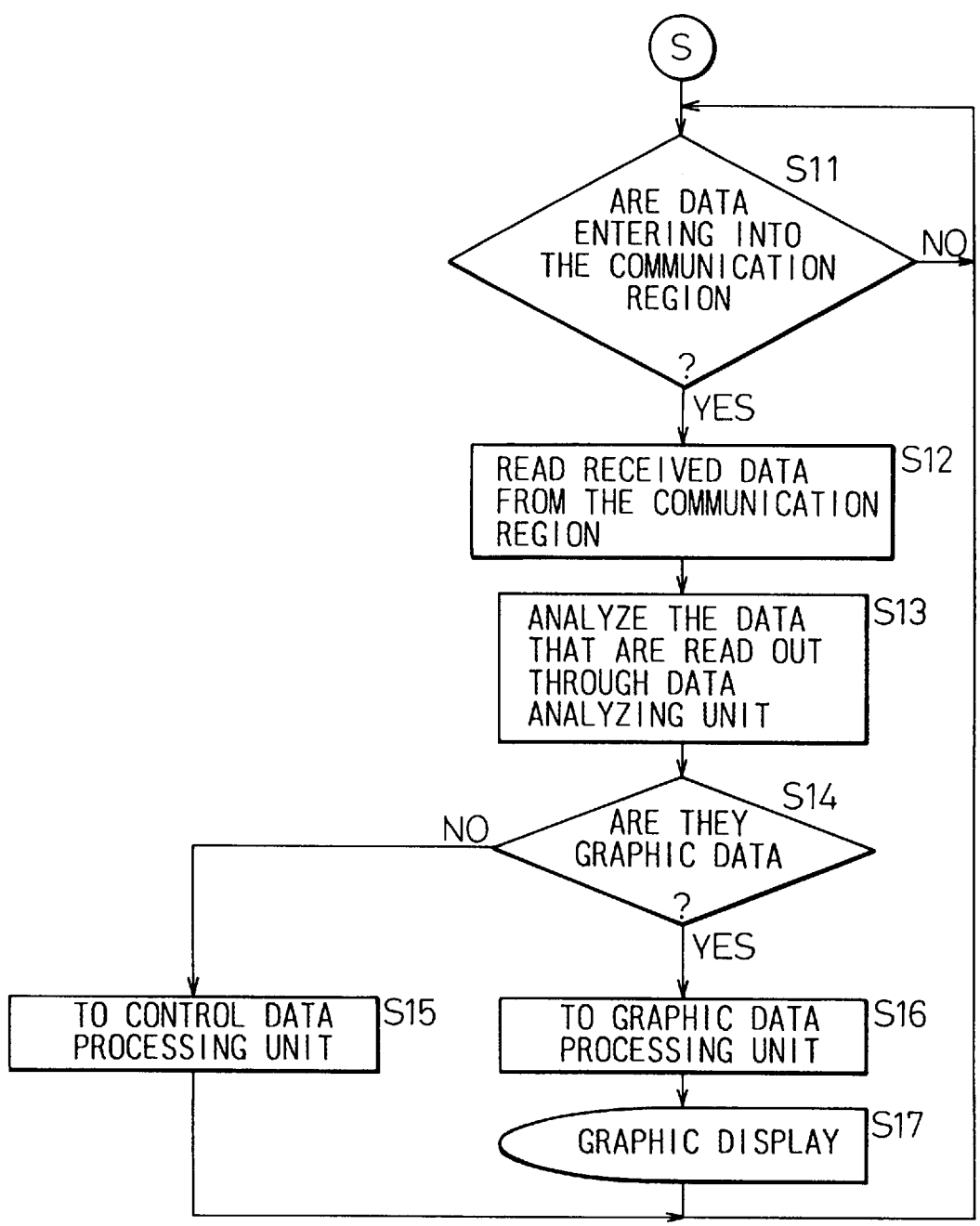
FIG. 3 is a flow chart illustrating the processing in an accelerator in the conventional graphic display unit.

The received data are then analyzed to determine whether the data received by a data analyzing unit 233 are graphic data or control data (step S13 in FIG. 3). The data are then passed to a graphic data processing unit 234 and to a control data processing unit 235 (steps S14, S15 and S16 in FIG. 3). The graphic data processing unit 234 processes the graphic data from the data analyzing unit 233 and displays the graphic data on the display (step S17 in FIG. 3).

Next, an outline of the present invention will be given with reference to FIG. 4.

In FIG. 4, reference numeral 1 denotes a graphic display unit, 2 denotes a computer, 2a denotes graphic data, 2b denotes a transfer data determination unit which determines whether the data is to be transferred to a shared memory 5a or to a graphic data storage means 3a in an accelerator 3, reference numeral 2c denotes a transfer flag storage region which stores a transfer flag which indicates whether the data is to be directly transferred to a graphic data storage means 3a together with the transfer data or whether the data is to be transferred to the shared memory 5a. Reference numeral 2d denotes an interrupt control unit which synchronizes the writing of data into the graphic data storage means 3a in the accelerator 3.

Reference numeral 3 denotes the accelerator, 3a denotes a graphic data storage means for storing graphic data that will be displayed on a display unit, 3b denotes a graphic data extension processing unit that subjects the graphic data to processing such as a coordinate conversion, 3c denotes a graphic data processing unit that processes the graphic data stored in the graphic data storage means 3a and displays the data on the display unit 4, and reference numeral 3d denotes an interrupt processing unit which, together with the interrupt control unit 2d, synchronizes (controls the sequence) the writing of data into the graphic data storage means 3a.

Reference numeral 5a denotes a shared memory. Transmission and reception of data between the computer 2 and the accelerator 3 are executed by writing the data into, and reading the data from, the shared memory 5a.

According to the first aspect of the present invention, the graphic display unit comprises a computer 2, an accelerator 3 connected to the computer 2, and a shared memory 5a capable of accessing both the computer 2 and the accelerator 3, wherein the accelerator 3 is provided with a graphic data storage means 3a for storing graphic data and a graphic data extension processing unit 3b that processes graphic data written into the shared memory 5a, the computer 2 is provided with a transfer data determination unit 2b which determines whether the graphic data is to be directly written into the graphic data storage means 3a or into the shared memory 5a, the host computer 2, based upon the result of determination by the transfer data determination unit 2b, writes graphic data that does not need to be extended directly into the graphic data storage means 3a and writes graphic data that dose need to be extended into the shared memory 5a, and the accelerator 3 receives the graphic data written into the shared memory 5a, processes the graphic data through the extension processing unit 3b, writes the graphic data into the storage means 3a, and displays, on a display unit 4, the graphic data that have been written into the graphic data storage means 3a.

According to the present invention, it is desired that the computer 2 is provided with a transfer flag storage region 2c which stores a transfer flag that indicates whether the graphic data are those that should be written directly into the graphic data storage means 3a or not, and the transfer data determination unit 2b determines whether the graphic data should be written into the graphic data storage means 3a or into the shared memory 5a.

According to the present invention, it is desired that the computer 2 is provided with an interrupt control unit 2d that issues an interrupt to synchronize the writing of graphic data into the graphic data storage means 3a, and that the accelerator 3 is provided with an interrupt processing unit 3d which, upon receiving the interrupt allows the graphic data that have been written into the graphic data storage means 3a to be displayed.

According to the second aspect of the present invention, there is provided a graphic display method by using a graphic display unit 1 which comprises a computer 2 containing graphic data 2a and a transfer data determination unit 2b, an accelerator 3 having a graphic data storage means 3a and a graphic data extension processing unit 3b and is connected to the computer, a shared memory 5a capable accessing both the computer and the accelerator, and a display unit 4 connected to the accelerator, wherein the graphic data 2a are written, using the transfer data determination unit 2b, in such a manner that the graphic data that do not need to be extended are directly written into the graphic data storage means 3a and the graphic data that do need to be extended are written into the shared memory 5a, the accelerator 3 writing the graphic data 2a of the shared memory 5a into the graphic data storage means 3a via the graphic data extension processing unit 3b, and the graphic data 2a written into the graphic data storage means 3a are displayed on the display unit 4.

It is desired that the transfer data determination unit 2b writes the graphic data 2a into the graphic data storage means 3a directly or via the shared memory 5a by using a flag from the transfer flag storage region 2c provided in the computer 2.

It is desired that the graphic display method further comprises a step of bringing the writing of graphic data via the shared memory 5a and via the graphic data extension processing unit 3b into synchronism with the direct write of graphic data into the graphic data storage means 3a from the transfer data determination unit 2b, and a step of causing the display of graphic data written into the graphic data storage means 3a.

In FIG. 4, the data which will be transferred from the computer 2 to the accelerator 3 are stored in the transfer flag storage region 2c together with the transfer flag that indicates the destination of the data. The transfer data determination unit 2b determines the destination of data transfer relying upon the transfer flag, and the computer 2 directly writes the graphic data that do not need to be extended into the graphic data storage means 3a of the accelerator 3 based upon the result of the above determination and writes the graphic data that needs to be extended, and the control data, into the shared memory 5a.

The accelerator 3 receives the graphic data written into the shared memory 5a, extends the data through the graphic data extension processing unit 3b and writes the data into the graphic data storage means 3a. The interrupt control unit 2d of the computer 2 and the interrupt processing unit 3d of the accelerator 3 work to change over the writing of graphic data from the computer 2 to the graphic data storage means 3a to the writing of extended graphic data into the graphic data storage means 3a, so that both the writings are synchronized.

The graphic data processing unit 3c processes the graphic data written into the graphic data storage means 3a from the computer 2 and the graphic data extended by the graphic data extension processing unit 3b and displays the data on the display unit 4. As described above, the graphic data that do not need to be extended are directly written into the graphic data storage means 3a of the accelerator 3, and the graphic data that do need to be extended are written into the shared memory 5a, processed through the graphic data extension processing unit 3b and written into the graphic data storage means 3a. Accordingly, figures can be displayed at high speed without depending upon the communication processing speed.

By providing a transfer flag which indicates whether the graphic data should be directly written into the graphic data storage means 3a or not, the destination of transfer can be determined quickly and easily. By providing the interrupt control unit 2d and the interrupt processing unit 3d, furthermore, the writing of data into the graphic data storage means 3a can be brought into synchronism.

FIG. 5 is a block diagram illustrating an embodiment of the present invention, wherein reference numeral 11 denotes a graphic display unit, and 12 denotes a computer. In the computer 12, reference numeral 121 denotes an application program that executes the graphic processing, 122 denotes a data analyzing unit for analyzing the application data, 123 denotes a data write processing unit for writing graphic data directly into a FIFO circuit (first-in-first-out circuit, hereinafter referred to as a FIFO circuit) in the accelerator 13 that will be described later, and 124 denotes a first communication processing unit for transmitting data to the accelerator 13.

Reference numeral 13 denotes the accelerator wherein reference numeral 131 denotes a communication region equipped with a shared memory capable of being accessed by both the computer 12 and the accelerator 13. The data are exchanged between the computer 12 and the accelerator 13 by writing data into the shared memory and by reading data from the shared memory. The communication region 131 in this embodiment is provided in the accelerator 13, but may be provided in the computer 12 or in another place.

Reference numeral 132 denotes a second communication processing unit that processes the data stored in the communication region and sends the data to a next data determining unit 133 which determines whether the received data are graphic data or control data, passes the graphic data to the graphic data extension processing unit 135 that will be described later and passes the control data to the control data processing unit 136.

Reference numeral 134 denotes a FIFO circuit for storing graphic data sent from the data write processing unit 123 and graphic data sent from the graphic data extension processing unit 135, reference numeral 135 denotes the graphic data extension processing unit, and 136 denotes the control data processing unit. The graphic data extension processing unit 135 subjects the graphic data to coordinate conversion or extends the graphic data when line segment data have attribute data for line thickness, color and end processing (arrows), and writes them to the above-mentioned FIFO circuit 134. The control data processing unit 136 processes the received control data depending upon the kind thereof. Reference numeral 137 denotes a graphic data processing unit that processes the data written into the FIFO circuit 134 and displays the data on the display unit 14.

Figure 6A:
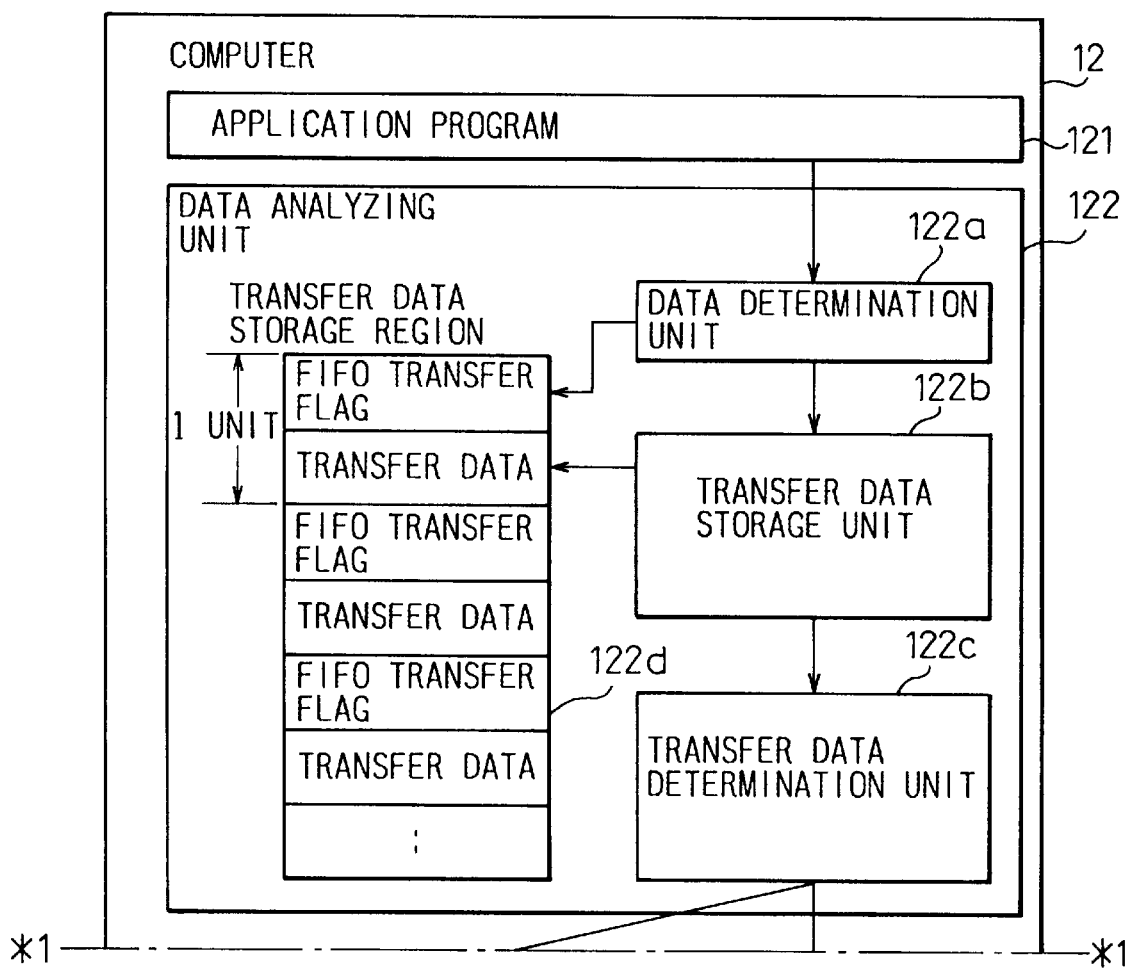
FIGS. 6A and 6B are block diagrams illustrating the computer of FIG. 5.
Figure 6B:
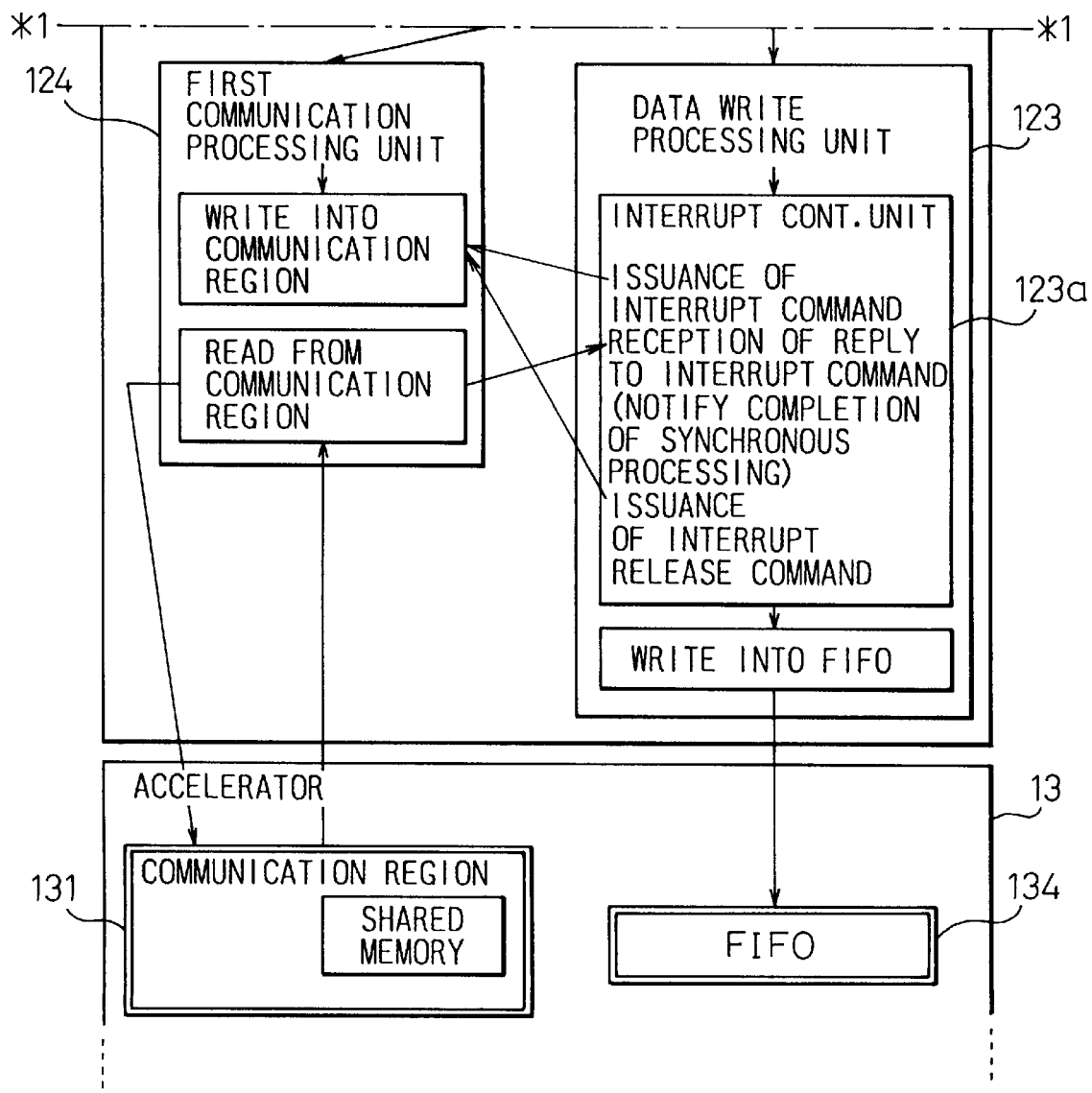
Figure 7:
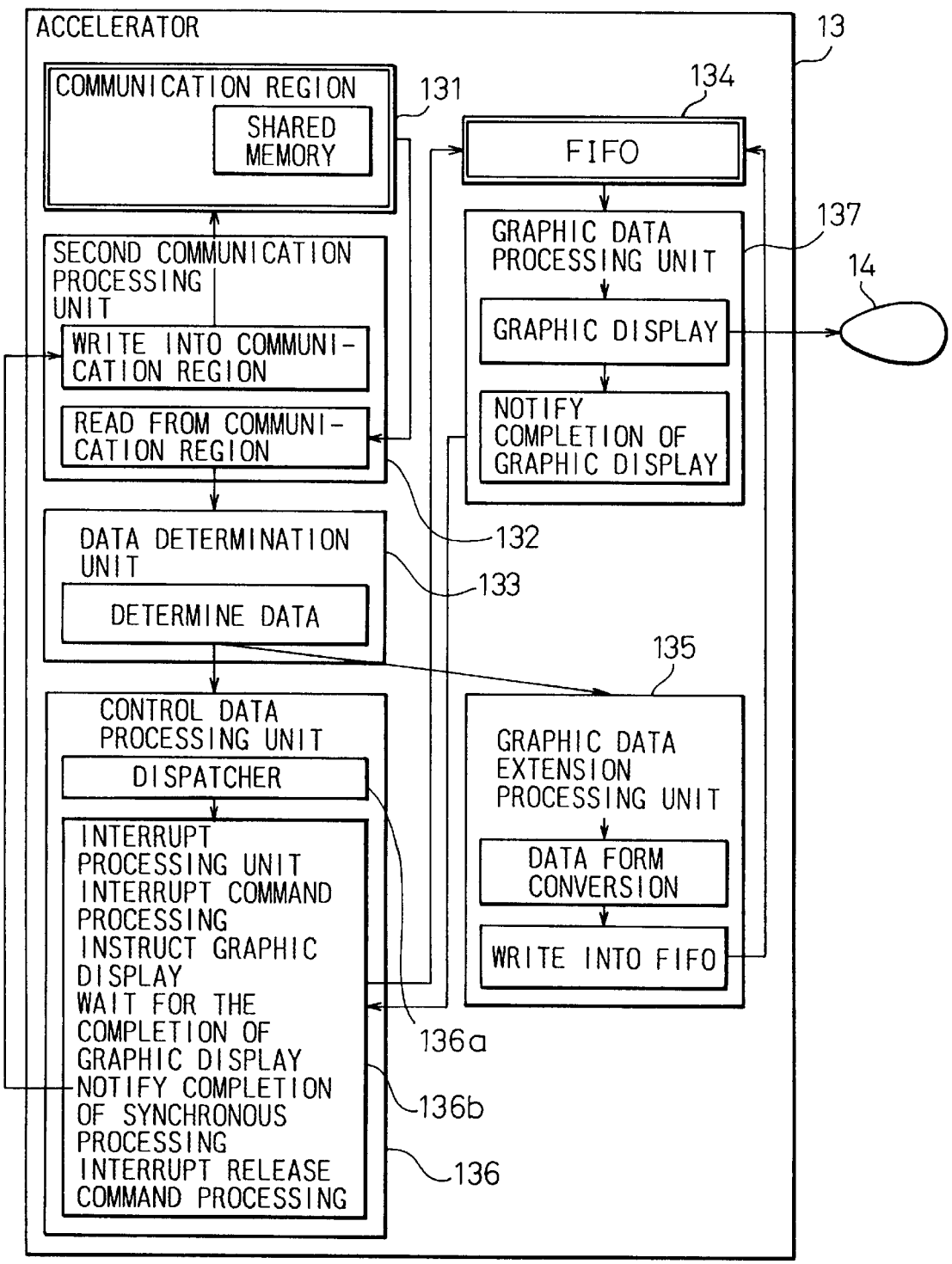
FIG. 7 is a block diagram illustrating the accelerator of FIG. 5.
Figure 8A:
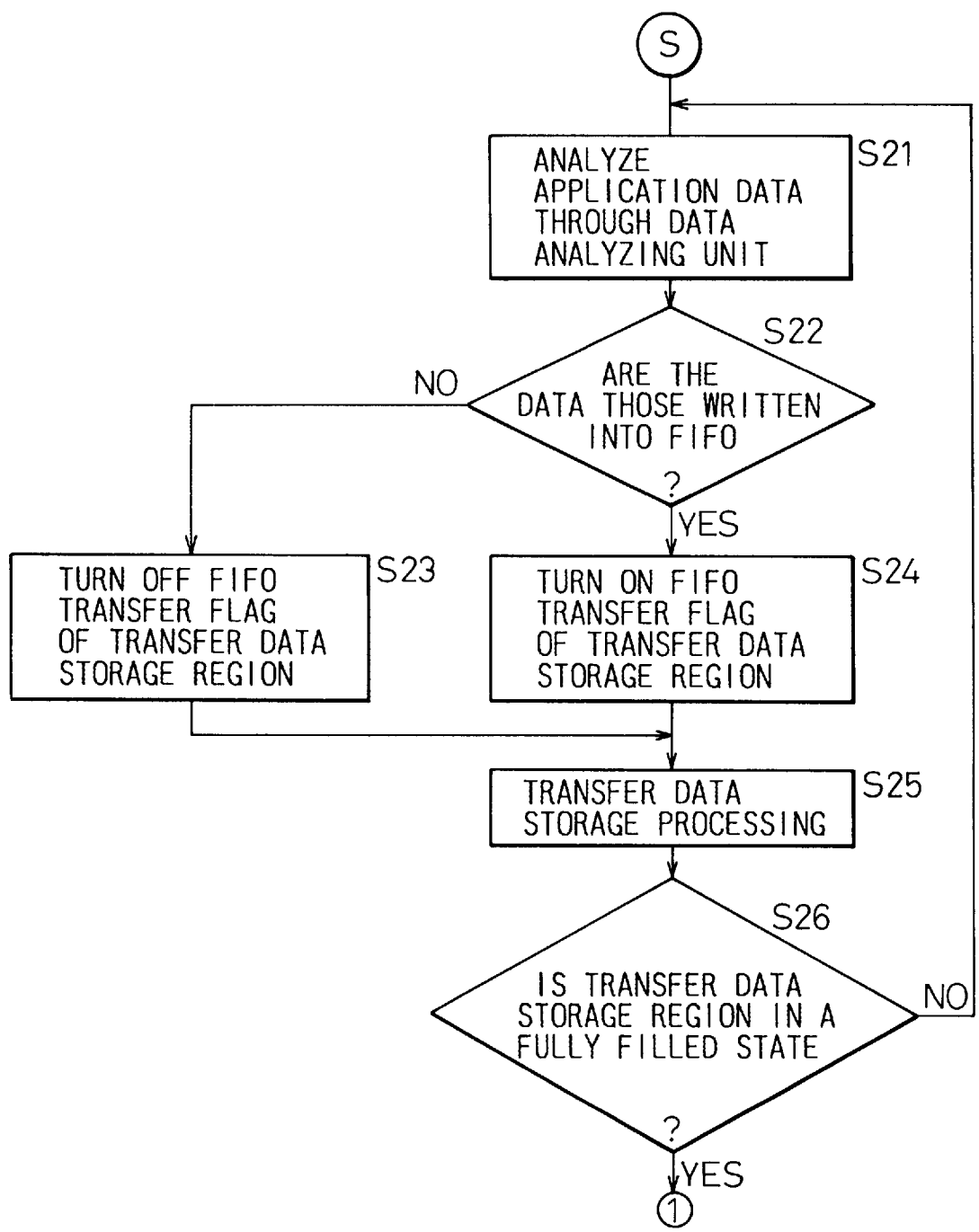
FIGS. 8A and 8B are flow charts illustrating the processing by the computer of FIG. 5.
Figure 8B:
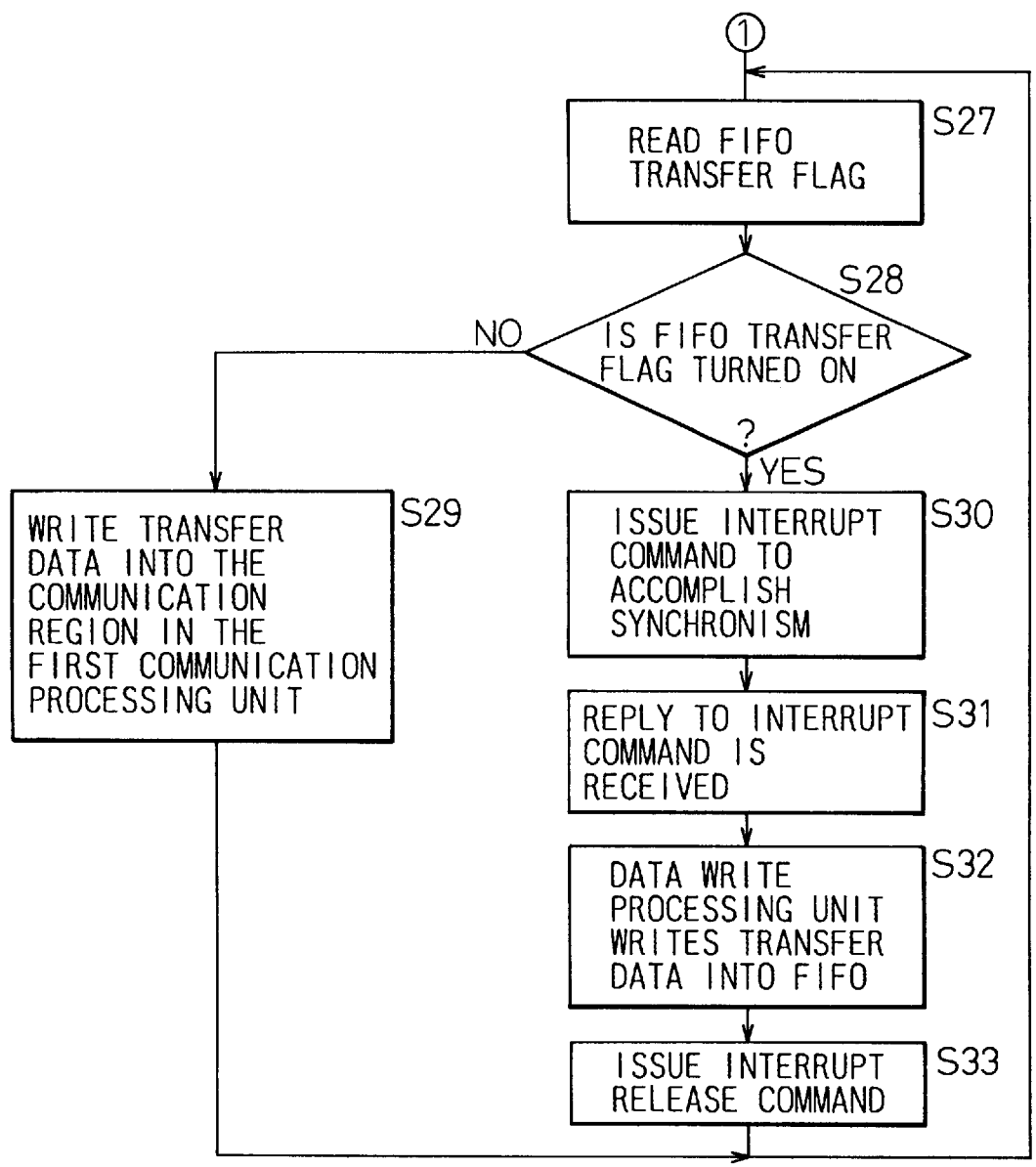
Figure 9A:
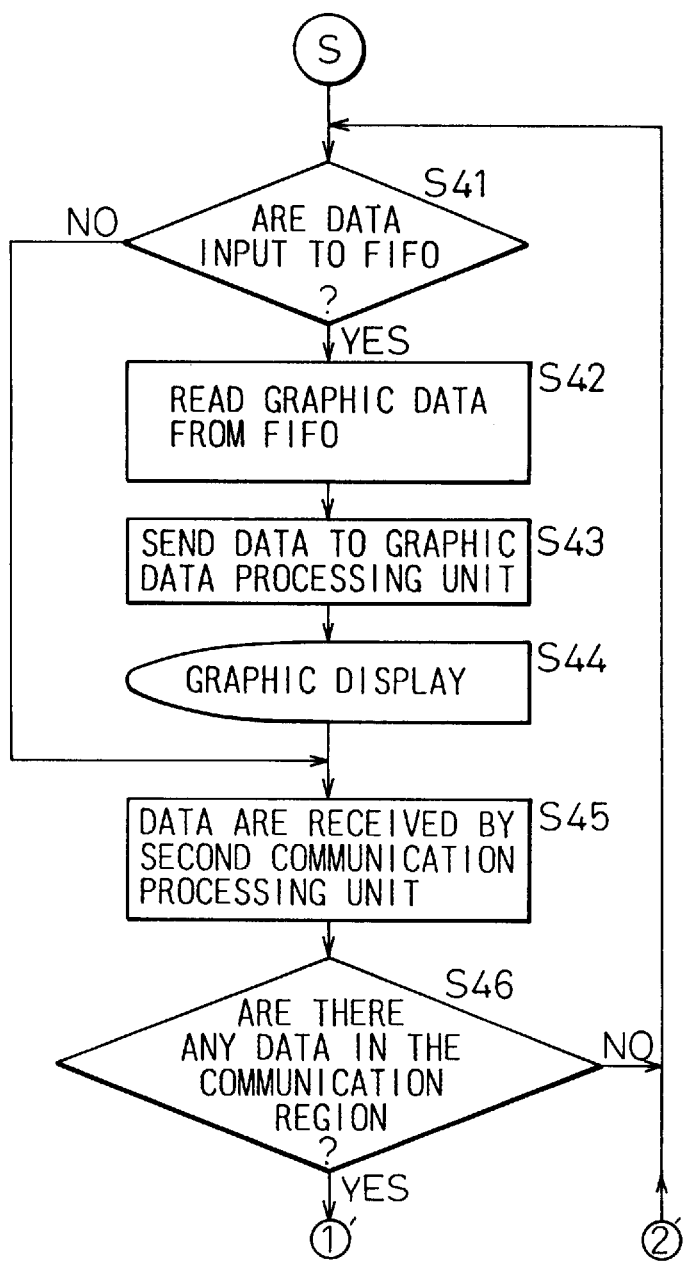
FIGS. 9A and 9B are flow charts illustrating the processing by the accelerator of FIG. 5.
Figure 9B:
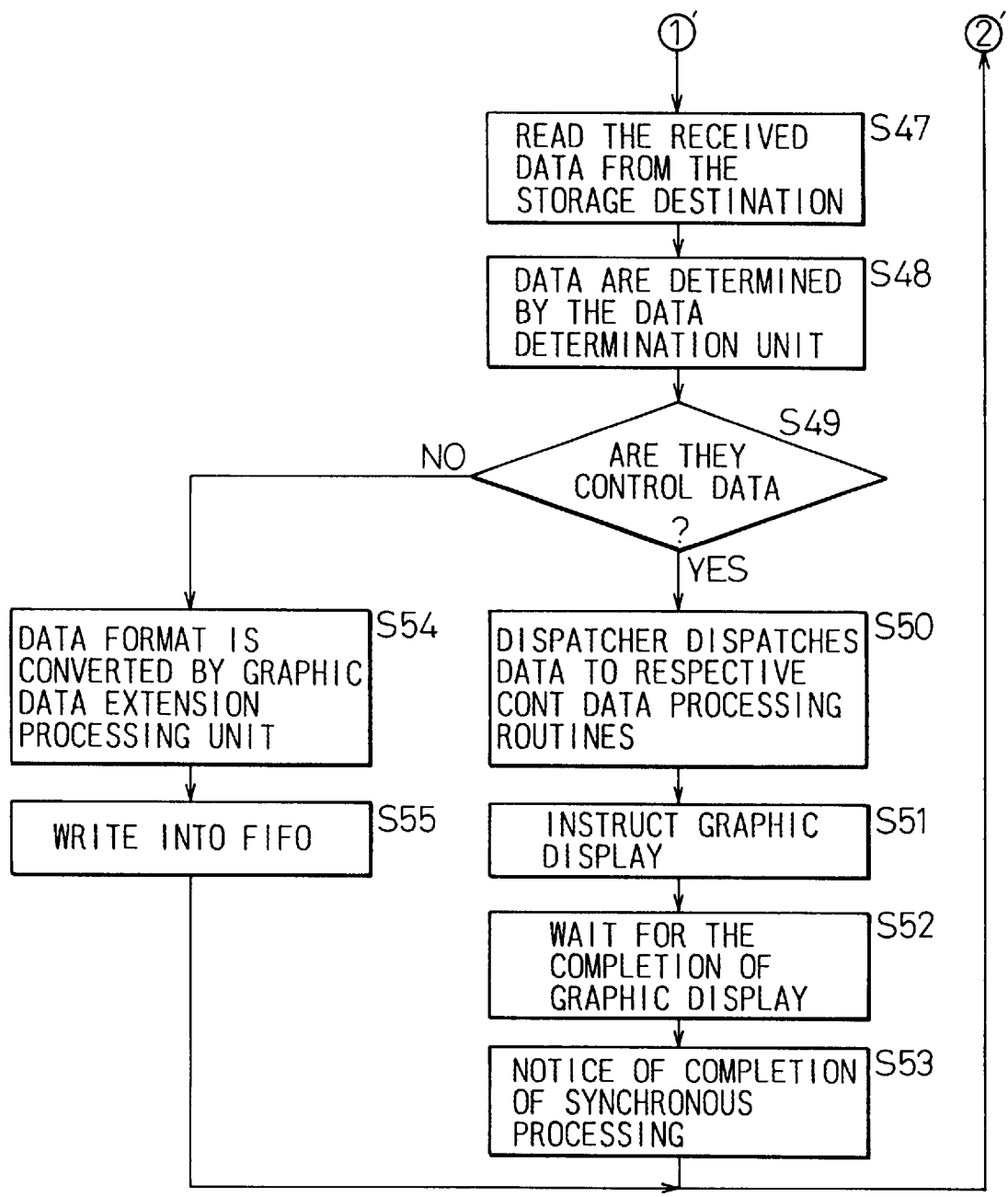

FIGS. 6A and 6B are diagrams illustrating the constitution of the computer 12 in detail, and FIG. 7 is a diagram illustrating the constitution of the accelerator 13 in detail, wherein the same portions as those of FIG. 5 are denoted by the same reference numerals. FIGS. 8A and 8B are flow charts illustrating the operation of the computer 12, and FIGS. 9A and 9B are flow charts illustrating the operation of the accelerator 13. The embodiment of the present invention shown in FIGS. 5, 6A, 6B and 7 will now be described with reference to flow charts shown in FIGS. 8A, 8B, 9A and 9B.

(1) Processing in the computer 12.

In FIGS. 6A and 6B, the application data processed by the application program 121 are sent to the data determination unit 122a of the data analyzing unit 122 and are analyzed. That is, the data determining unit 122a determines whether the application data are graphic data that needs to be extended because the data has attribute data such as thickness of line segment, color, etc. as described above, or control data, or graphic data that can be directly written into the FIFO circuit 134 of the accelerator 13 and can be directly displayed (step S21 of FIG. 8A).

When the data are those that can be directly written into the FIFO circuit 134, the FIFO transfer flag that is provided at a header portion of each unit of data stored in the transfer data storage region 122d is turned on. When the data cannot be directly written into the FIFO circuit 134, the FIFO transfer flag is turned off (steps S22, S23 and S24).

A transfer data storage unit 122b stores, in the transfer data storage region 122d, the transfer data that follows the header portion for every predetermined amount (step S25). It is then determined whether the transfer data storage region 122d is in a fully-filled state or not (step S26). When it is not in a fully-filled state, the above-mentioned processings are repeated.

When the transfer data storage region 122d is fully filled, the transfer data determining unit 122c reads the FIFO transfer flag (step S27 in FIG. 8B) and determines whether the FIFO transfer flag is turned on or not (step S28).

When the FIFO transfer flag is turned on, an interrupt control unit 123a in the data write processing unit 123 issues an interrupt to a communication processing unit 124 to bring into synchronism the writing of data into the FIFO circuit 134 (step 30). The communication processing unit 124 writes the interrupt command signal for interrupting into the communication region 131 and waits for the notice of completion of synchronism to appear in the communication region 131 as a reply to the interrupt.

Upon receiving the interrupt, the accelerator 13 outputs the notice of completion of synchronous processing when the writing of data into the FIFO circuit 134 is finished and when the graphic display is completed.

This signal is written as an interrupt reply signal into the shared memory of the communication region 131, and the communication processing unit 124 of the host computer 12 reads the interrupt reply signal.

When the interrupt control unit 123a receives the interrupt reply signal (notice of completion of synchronous processing) (step S31), the data write processing unit 123 writes graphic data to which the FIFO transfer flag is attached and is turned on, in the FIFO 134 of the accelerator 13 (step S32). When the writing of data is finished, the interrupt control unit 123a issues an interrupt release command and transmits it to the accelerator 13 (step S33).

The data to which the FIFO transfer flag is not turned on, i.e., graphic data that needs to be extended and control data, are written by the communication processing unit 124 into the shared memory in the communication region 131 (step S29). After the above-mentioned processings are finished, the program returns to step S27 in FIG. 8B and the above-mentioned processing is repeated.

(2) Processing in the accelerator 13.

The accelerator 13 determines whether the data are to be input to the FIFO circuit 134 or not (step S41 in FIG. 9A). When the data are to be input thereto, graphic data are read out from the FIFO circuit 134 (step S42). A graphic data processing unit 137 displays the graphic data that are read out on the display 14 (steps S43, S44).

When no data is input to the FIFO circuit 134 or when the graphic display is finished, the data transmitted from the computer are received by the communication processing unit 132 (step S45).

It is then determined whether there are any data in the shared memory in the communication region 131 or not (step S46). When there is no data in the shared memory, the program returns back to the step S41 in FIG. 9A to repeat the above-mentioned processing.

When the data have been input to the shared memory in the communication region 131, the communication processing unit 132 reads the data (step S47 in FIG. 9B), and the data determination unit 133 determines whether the data that are read are graphic data or control data (steps S48 and S49 in FIG. 9B). When the data that are read out are not control data, the graphic data extension processing unit 135 converts the data format (step S54 in FIG. 9B) and writes the data into the FIFO circuit 134 (step S55).

When the data that are read out are control data, the dispatcher 136a in the control data processing unit 136 dispatches the control data, depending upon the kinds thereof, to the control routines (step S50 in FIG. 9B).

When the control data sent from the computer, instructs an interruption, the interrupt processing unit 136b in the control data processing unit 136 instructs the FIFO circuit 134 to execute a graphic display (step S51) and waits for the completion of the graphic display (step S52). Upon receipt of the above instruction, the graphic data processing unit 137 reads the data from the FIFO circuit 134 and executes the graphic display. When the graphic display is completed for all of the data, the graphic data processing unit 137 sends a notice of completion of graphic display back to the interrupt processing unit 136b in the control data processing unit 136.

Upon receipt of a notice of completion of graphic display, the interrupt processing unit 136b issues a notice of completion of synchronous processing, writes the data into the shared memory in the communication region 131 via the communication processing unit 132 and sends the data to the computer 12.

Upon receipt of the notice of completion of the synchronous processing, the computer 12 writes graphic data into the FIFO circuit 134 as described above.

After the above-mentioned processing is finished, in the accelerator 13, the process returns back to the step S41 in FIG. 9A to repeat the above-mentioned processing. In the above-mentioned embodiment, the graphic data that do not need to be extended are directly written into the FIFO circuit of the accelerator 13 without passing through the communication processing unit. Therefore, the graphic display can be accomplished at high speed without depending upon the operation time of the communication processing program.

Though the graphic data to be displayed are written into the FIFO circuit in the above-mentioned embodiment, it should be noted that the present invention is in no way limited to the above embodiment only and the graphic data may be written into other storage means.

According to the present invention as described above, the graphic data that do not need to be extended are directly written into the graphic data storage means of the accelerator, the graphic data that need to be extended are written into the shared memory, processed by the graphic data extension processing unit in the accelerator and are written into the graphic data storage means. The graphic data stored in the graphic data storage means are then displayed on the display unit, enabling the graphic display to be accomplished at high speed without depending upon the speed of communication processing.

Furthermore, provision is made of a transfer flag, to indicate whether the graphic data be directly written into the graphic data storage means or not, enabling the destination of transfer to be determined quickly and easily. Furthermore, the computer and the accelerator are provided with an interrupt control unit and with the interrupt processing unit, respectively, enabling the data to be written into the graphic data storage means in synchronism.

I claim:

1. A graphic display unit comprising:
    a shared memory storing graphic data;
    an accelerator which accesses said shared memory to receive graphic data written into said shared memory, said accelerator provided with a graphic data storage means, operating on a first-in-first-out basis, for storing graphic data and a graphic data extension processing unit that processes graphic data written into said shared memory and writes the processed graphic data into the data graphic storage means, said accelerator being provided with an interrupt processing unit which, upon receiving an interruption command, causes the display of the graphic data written into said graphic data storage means;

a computer which accesses said shared memory, said computer provided with a transfer flag storage region which stores a transfer flag that indicates whether the graphic data should be written directly into said graphic data storage means or into said shared memory, and a transfer data determination unit which, based on the transfer flag, determines whether the graphic data should be directly written into said graphic data storage means or into said shared memory and based upon the determination writes graphic data that does not need to be extended directly into said graphic data storage means and writes graphic data that does need to be extended into said shared memory, said computer being provided with an interrupt control unit that issues an interruption command for synchronizing the writing of graphic data into said graphic data storage means; and a display unit which displays the graphic data written into said graphic data storage means.

2. A method of producing graphics on a display unit using a computer, an accelerator having a graphic data storage operating on a first-in-first-out basis, and a shared memory accessed by both the computer and the accelerator, the method comprising:

storing a flag in a transfer flag storage region in the computer indicating whether the graphic data is to be directly written to the graphic data storage or to the shared memory;

based on the flag, writing graphic data that does not need to be extended directly into the graphic data storage;

based on the flag, writing graphic data that does need to be extended into the shared memory;

synchronizing the direct writing of graphic data into the graphic data storage;

writing the graphic data in the shared memory into the graphic data storage via a graphic data extension processing unit in the accelerator; and displaying the graphic data written into the graphic data storage on the display unit.

* * * * *